United States Patent [19]
Tsubota et al.

[11] Patent Number: 5,596,023
[45] Date of Patent: Jan. 21, 1997

[54] SEALING MATERIAL FOR LIQUID CRYSTAL DISPLAY PANEL, AND LIQUID CRYSTAL DISPLAY PANEL USING IT

[75] Inventors: Kojiro Tsubota, Nara; Kazuyoshi Fujioka, Kashihara; Yutaka Takafuji, Nara; Tsuyoshi Kurokawa; Fumio Tanaka, both of Niigata, all of Japan

[73] Assignee: Sharp Kabushiki Kaisha, Osaka, Japan

[21] Appl. No.: 392,400

[22] Filed: Feb. 22, 1995

Related U.S. Application Data

[63] Continuation of Ser. No. 151,745, Nov. 15, 1993, abandoned.

[30] Foreign Application Priority Data

Nov. 18, 1992 [JP] Japan ................... 4-308515

[51] Int. Cl.⁶ ........................................... C08F 2/46
[52] U.S. Cl. ........................................... 522/100; 430/20
[58] Field of Search ........................... 522/100; 430/20

[56] References Cited

U.S. PATENT DOCUMENTS

| | | | |
|---|---|---|---|
| 3,450,613 | 6/1969 | Steinberg | 522/103 |
| 4,494,825 | 1/1985 | Sasaki et al. | 522/103 |
| 5,130,831 | 7/1992 | Kohara et al. | 430/20 |
| 5,439,956 | 8/1995 | Noguchi | 522/92 |

FOREIGN PATENT DOCUMENTS

| | | |
|---|---|---|
| 1-243029 | 9/1989 | Japan . |
| 40007320 | 1/1992 | Japan . |
| 50295087 | 11/1993 | Japan . |

*Primary Examiner*—Mark Chapman
*Attorney, Agent, or Firm*—Birch, Stewart, Kolasch & Birch, LLP

[57] ABSTRACT

A liquid crystal display panel in which a liquid crystal composition is held between a pair of transparent substrates and the peripheral edges of both the substrates are sealed with a sealing material comprising (a) a partially esterified epoxy (meth)acrylate resin where 10–90% of an equivalent of the epoxy group of a bisphenol A type epoxy resin is (meth)acrylated, (b) a photopolymerization initiator, and (c) a thermosetting agent; and a sealing material for the liquid crystal display panel comprising the above-mentioned components (a), (b) and (c).

8 Claims, 1 Drawing Sheet

SEALING MATERIAL FOR LIQUID CRYSTAL DISPLAY PANEL, AND LIQUID CRYSTAL DISPLAY PANEL USING IT

This application is a continuation of application Ser. No. 08/151,745 filed on Nov. 15, 1993, now abandoned.

BACKGROUND OF THE INVENTION (i) Field of the Invention

The present invention relates to a sealing material for a liquid crystal display panel and the liquid crystal display panel using the sealing material.

(ii) Description of the Prior Art

In general, liquid display panels can be roughly classified into a simple matrix type liquid crystal display panel which can be formed by integrally sticking a pair of substrates provided with striped transparent electrodes so as to keep a certain space between these substrates, and then holding a liquid crystal composition between the substrates; and an active matrix type liquid crystal panel which can be formed by integrally sticking a pair of substrates so as to keep a certain space therebetween, at least one of the pair of substrates being equipped with a liquid crystal control element such as TFT, MIM or a diode, and then holding a liquid crystal composition between the substrates. In particular, the active matrix type liquid crystal panel is excellent in the control performance of contrast and half tone, and for this reason, it has been used in a color image display or a projection type display.

When an active matrix substrate equipped with an element such as TFT or a diode and bus line electrodes is integrally stuck to an opposite electrode substrate provided with a glare protecting pattern for protecting the element on the active matrix substrate from intensive light, these substrates are required to be aligned with high precision in order to prevent adjacent pixels from mixing and to inhibit contrast and TFT properties from deteriorating.

Heretofore, as a sealing material for sticking the pair of substrates so as to keep the certain space therebetween, a thermosetting epoxy resin has been used.

However, in the case that the thermosetting epoxy resin-based sealing material is used, a pressurizing step and a heating step which take a long period of time are necessary to set the sealing material by which the substrates are integrally stuck, and therefore there is the problem that the employment of the thermosetting epoxy resin-based sealing material is not suitable for continuous mass production. In addition, when the pair of substrates are different from each other in materials, the alignment tends to deviates owing to the difference of thermal expansion coefficient between the substrates, and the thickness of a cell is uneven, so that the display quality of the obtained liquid crystal display panel deteriorates inconveniently.

In recent years, there has been reported a liquid crystal display panel using an ultraviolet-setting resin as another sealing material (Japanese Patent Application Laid-open Hei 1 No. 243029).

However, the utilization of the ultraviolet-setting resin leads to some drawbacks. That is, the ultraviolet-setting resin has high moisture permeability, and when an ionic or an unreacted material is dissolved in the liquid crystal, the orientation of the liquid crystal is disordered in the vicinity of a sealed portion, so that the liquid crystal composition deteriorates and thus its electrical resistance noticeably declines. Furthermore, the ultraviolet-setting resin is inconveniently weaker in adhesive strength to the substrates than the thermosetting epoxy resin-based sealing material. Hence, any sealing material having both reliability and adhesive strength has not been present.

SUMMARY OF THE INVENTION

An object of the present invention is to provide a sealing material for a liquid crystal display panel having both of improved reliability and adhesive strength. Another object of the present invention is to provide a liquid crystal display panel using the sealing material. The sealing material of the present invention can be set in a short period of time, which leads to the improvement of production efficiency. Moreover, the sealing material has excellent adhesive strength to substrates and extremely low permeability of moisture and the like, and it has little influence on a liquid crystal, so that the poor orientation of the liquid crystal, the deterioration of electrical resistance and the like does not take place any more.

For the sake of achieving the above-mentioned objects, the first gist of the present invention is directed to a sealing material for a liquid crystal display panel comprising the following components (a), (b) and (c):

(a) a partially esterified epoxy (meth)acrylate resin in which 10–90% of an equivalent of the epoxy group of a bisphenol A type epoxy resin is (meth)acrylated, (b) a photopolymerization initiator, and (c) a thermosetting agent.

The second gist of the present invention is directed to a liquid crystal display panel which comprises a pair of transparent substrates and a liquid crystal composition held between the pair of transparent substrates, the inside surface of at least one of the substrates being equipped with transparent electrodes or a liquid crystal control element, the peripheral edges of both the substrates being sealed with a sealing material comprising the following components (a), (b) and (c):

(a) a partially esterified epoxy (meth)acrylate resin in which 10–90% of an equivalent of the epoxy group of a bisphenol A type epoxy resin is (meth)acrylated, (b) a photopolymerization initiator, and (c) a thermosetting agent.

In the present invention, the sealing material is constituted as described above. Therefore, when the sealing material is used as a sealing material for a liquid crystal display panel to integrally stick the substrates, a long-time heat treatment is not necessary, and a liquid crystal cell can be obtained only by irradiation of ultraviolet rays, so that continuous mass production can be attained and hence cost can be remarkably reduced. Furthermore, since the sealing material is set by the irradiation of ultraviolet rays prior to a heat treatment step, the substrates are prevented from sliding upward and downward owing to the viscosity drop of the sealing material, or they are prevented from deviating upward and downward owing to the difference of thermal expansion coefficient between the different kinds of substrates, and the thickness of the cell can be substantially maintained. In consequence, the manufacturing cost of the panel can be remarkably reduced.

DESCRIPTION OF THE PREFERRED EMBODIMENTS

Figure 1:
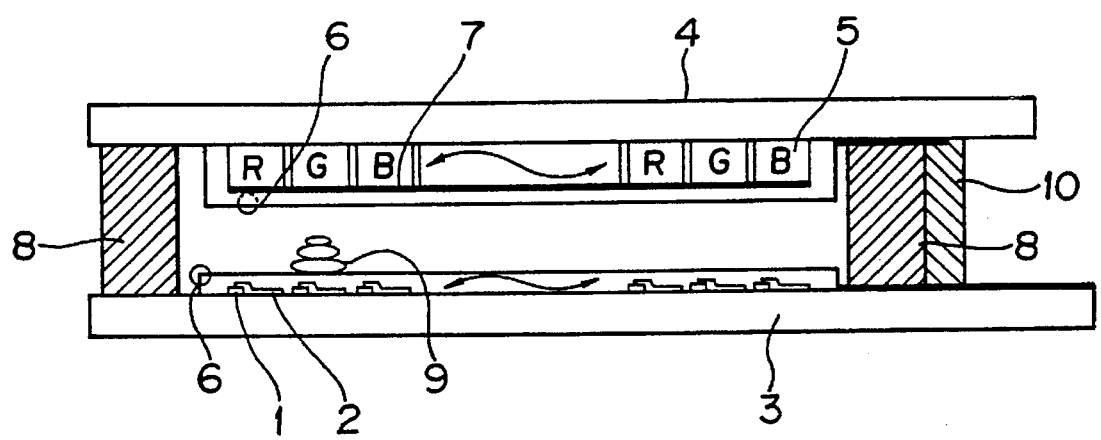
FIG. 1 is a sectional view illustrating a liquid crystal display panel of the present invention.

Now, the present invention will be described in detail.

A component (a) which can be used in the present invention is a partially esterified epoxy (meth)acrylate resin in which 10–90%, preferably 20–80% of an equivalent of the epoxy group of a bisphenol A type epoxy resin is (meth)acrylated, and this component (a) can be obtained by an esterification reaction of a bisphenol A type epoxy resin and (meth)acrylic acid in a predetermined equivalent ratio. When a ratio of the equivalent of the (meth)acryloyl group in the obtained resin to the total equivalent is less than 10%, the ultraviolet setting properties of the sealing material are poor, and the positional deviation of the substrates cannot be prevented, when they are integrally stuck. In addition, when it is more than 90%, the adhesive strength of the sealing material to the substrates declines after setting of the sealing material.

No particular restriction is put on the bisphenol A type epoxy resin, but examples of this type epoxy resin include Epicoat 828, Epicoat 834, Epicoat 1001 and Epicoat 1004 (trade names, made by Yuka Shell Epoxy Co., Ltd.), and DER 331, DER 332, DER 337, DER 661, DER 669, QUATREX 1010 and QUATREX 1410 (trade names, made by Dow Chemical Japan Co.,). These bisphenol A type epoxy resins may be used singly or in combination.

No particular restriction is put on a photopolymerization initiator as a component (b) which can be used in the present invention, so long as it can initiate the polymerization of the component (a). Examples of the photopolymerization initiator include a radical type photopolymerization initiator for generating radicals by the irradiation of ultraviolet rays to initiate the reaction of the (meth)acryloyl group, and a cation type photopolymerization initiator for liberating a Lewis acid catalyst to initiate the reaction of an epoxy group. In this connection, the cation type photopolymerization initiator may partially generate radicals simultaneously with the acid catalyst to initiate the reaction of the (meth)acryloyl group.

Examples of the radical type photopolymerization initiator include diethoxy acetophenone, benzophenone, benzyl, benzoin isobutyl ether, benzyl dimethyl ketal, 1-hydroxycyclohexyl phenyl ketone, diethyl thioxanthone, 2-ethyl anthraquinone, 2-hydroxy-2-methyl-1-phenylpropane-1-one, 1-(4-isopropylphenyl)-2-hydroxy-2-methylpropane-1-one and 2-methyl-[4-(methylthio)phenyl]-2-morpholino-1-propane.

Examples of the cation type photopolymerization initiator include aromatic diazonium salts, triallylsulfonium salts, diallyliodonium salts and triallylselenium salts of Lewis acids as well as metallocene compounds. Commercially available examples include Adecaoptomer SP-150, Adecaoptomer SP-170 (trade names, made by Asahi Denka Kogyo K.K.), Cyracure UVI-6950 and Cyracure UVI-6970 (trade names, made by Union Carbide Japan Corp.), and GC24-61 (trade name, Japanese Ciba-GeiGy).

These photopolymerization initiators may be used singly or in combination irrespective of the radical type or the cation type.

A ratio of the photopolymerization initiator to be blended which is the component (b) is in the range of 0.1 to 15 parts (hereinafter, "part(s)" means "part(s) by weight" in every case), preferably 0.5 to 10 parts with respect to 100 parts by weight of the component (a). If this ratio is less than 0.1 part, the ultraviolet setting properties of the sealing material are insufficient, so that the positional deviation of the substrates cannot be prevented on occasion, when they are integrally stuck. In order to prevent this positional deviation, it is necessary to irradiate the sealing material for a very long time. If this ratio is more than 15 parts, the physical properties of the set sealing material decline, so that the adhesive strength of the sealing material to the substrates is poor and the remaining polymerization initiator has a bad influence on the liquid crystal at times.

No particular restriction is put on the thermosetting agent which is a component (c) of the present invention, so long as it can polymerize the component (a), when heated. Examples of the thermosetting agent for reacting the epoxy group of the component (a) include imidazoles such as 2-ethyl-4-methylimidazole, 1-cyanoethyl-2-ethyl-4-methylimidazole, 2-phenyl-4-methyl-5-hydroxymethylimidazole, 1-cyanoethyl-2-phenylimidazolium trimellitate, 2,4-diamino-6-[2-methylimidazolyl-(1)]-ethyl-S-triazine; organic acid hydrazides such as succinic acid dihydrazide, adipic acid dihydrazide and salicylic acid dihydrazide; acid anhydrides; amines; salts of Lewis acids; and dicyandiamide. Examples of the thermosetting agent for reacting the (meth)acryloyl group which is the component (a) include organic peroxides such as 1,1-bis(t-butylperoxy)-3,3,5-trimethylcyclohexane, cumene hydroperoxide, di-t-butyl peroxide, dicumyl peroxide, 2,5-dimethyl-2,5-di(t-butylperoxy)hexane, lauroyl peroxide and benzoyl peroxide. These thermosetting agents can be used singly or in combination.

A ratio of the thermosetting agent which is the component (c) is in the range of 0.1 to 20 parts, preferably 0.5 to 15 parts with respect to 100 parts of the component (a). When this ratio is less than 0.1 part, the setting of the heated sealing material is poor, and the adhesive strength of the substrates declines on occasion. Conversely, when it is more than 20 parts, the physical properties of the set sealing material deteriorate, so that the adhesive strength of the sealing material to the substrates is insufficient and the remaining thermosetting agent has a bad influence on the liquid crystal at times.

In the sealing material of the present invention, some additives may be used in such an amount as not to impair the effect of the present invention, if necessary, in addition to the components (a) to (c). Examples of the additives include a reactive diluent for adjusting viscosity, an inorganic filler for improving adhesive strength and screen printing properties, and a coupling agent for improving the adhesive strength.

Examples of the reactive diluent include 2-ethylhexyl (meth)acrylate, 2-hydroxyethyl (meth)acrylate, phenoxyethyl (meth)acrylate, tetrahydrofurfuryl (meth)acrylate, Carbitol (meth)acrylate, cyclohexyl (meth)acrylate, benzyl (meth)acrylate, dicyclopentenyloxyethyl (meth)acrylate, lauryl (meth)acrylate, isobornyl (meth)acrylate, 1,4-butanediol di(meth)acrylate, diethylene glycol di(meth)acrylate, neopentyl glycol di(meth)acrylate, trimethylolpropane tri(meth)acrylate, pentaerythritol tri(meth)acrylate and dipentaerythritol hexaacrylate. The amount of the reactive diluent to be blended is preferably 100 parts or less with respect to 100 parts of the component (a).

Examples of the inorganic filler include talc, kaolin, clay, barium sulfate, quartz, magnesium carbonate, calcium carbonate, silica, fine silica particles, titanium oxide, aluminum oxide, aluminum hydroxide and aluminum silicate. The amount of the inorganic filler to be blended is preferably 100 parts or less with respect to 100 parts of the component (a).

Examples of the coupling agent include silane coupling agents such as vinyltrimethoxysilane, γ-methacryloxypropyltrimethoxysilane, γ-glycidoxypropyltrimethoxysilane, γ-aminopropyltriethoxysilane and β-(3,4-epoxycyclohexyl-)ethyltrimethoxysilane; titanate coupling agents such as isopropyltriisostearoyl titanate, isopropyltris(dioctyl pyrophosphate) titanate, isopropyltri(N-aminoethyl-aminoethyl) titanate and tetraoctylbis(ditridecyl phosphite) titanate; and aluminum coupling agent such as acetoalkoxyaluminum diisopropionate. The amount of the coupling agent to be blended is preferably 10 parts or less with respect to 100 parts of the component (a).

Other additives can also be used, and examples of the other additives include a leveling agent, an anti-foaming agent and a polymerization inhibitor.

The sealing material of the present invention preferably contains a spacer having a particle diameter corresponding to the gap between the substrates of the liquid crystal display panel. A known spacer can be used, and examples of the spacer include polymer beads and glass fibers, but any spacer can be used without being limited thereto, so long as it has similar particle distribution and hardness. The amount of the spacer to be blended is preferably in the range of 1 to 50 parts with respect to 100 parts of the sealing material composition.

The liquid crystal display panel of the present invention, in the case of a transparent type, is a panel in which a liquid crystal composition is held between a pair of transparent substrates and the peripheral edges of both the substrates are sealed with the sealing material. On the inside surface of at least one of the transparent substrates, transparent electrodes or a liquid crystal control element is disposed.

As the transparent electrodes, glass substrates, quartz substrates and plastic substrates can be used. As the liquid crystal control element, there can be used a known element for controlling an electro-optical effect of the liquid crystal, and examples of the liquid crystal control element include amorphous silicon TFT, polycrystalline silicon TFT, MIM, a diode and single-crystal MOSFET. In the case of a reflective type, a silicon substrate can be used for one of both the substrates.

With regard to the liquid crystal display panel of the present invention, for example, as shown in FIG. 1, liquid crystal control elements 1 and pixel electrodes 2 are provided on a substrate 3, and three primary color filters 5 of red, green and blue can be arranged in a matrix state on an opposite substrate 4 so as to correspond to the pixel electrodes 2 formed on the substrate 3. The color filters can be formed by a known method such as a dyeing method, a printing method, a vapor deposition method, an electrodeposition method or a pigment dispersion method. On the color filters 5, a transparent electrode 7 can be formed.

Furthermore, on both the opposite surfaces of the two substrates, organic polymer films 6 are formed, and a rubbing treatment is preferably carried out so that the liquid crystal composition may be oriented in a predetermined direction. In addition, a common transition 10 can be provided on the outer surface of a sealing material 8.

As the liquid crystal composition which can be used in the present invention, a known liquid crystal composition can be used, and examples of the liquid crystal composition include ferroelectric liquid crystals and anti-ferroelectric liquid crystals mainly comprising fluorine, cyanogen, cyclohexane, phenylcyclohexane, biphenyl and a Schiff base.

In the liquid display panel of the present invention, the above-mentioned sealing material 8 is applied onto the peripheral edge of one of the substrates in the known manner such as screen printing, a portion of the peripheral edge being not applied so as to form an inlet of the liquid crystal composition. Next, both the substrates are superposed upon each other, while aligned so that the color filters 5 may correspond to the pixels of the elements 1, and they are irradiated with ultraviolet rays to set the sealing material, followed by further thermosetting to prepare a liquid crystal cell. Afterward, a liquid crystal composition 9 is injected into a space between the substrates through the inlet, and the inlet is then preferably sealed with the above-mentioned sealing material 8. This sealing material 8 of the sealed inlet can be set in like manner.

The irradiation time of ultraviolet rays is in the range of 1 to 60 seconds in the case that a 2 kW high-voltage mercury vapor lamp is used, and a thermosetting time is preferably in the range of 1 to 60 minutes at a temperature of 80° to 200° C. In this connection, in order to seal the inlet for the injection of the liquid crystal composition, a known sealer may be used.

Next, for the detailed description of the effects of the present invention, examples of the present invention which meet the constitution of the present invention will be compared with comparative examples out of the scope of the present invention.

EXAMPLE 1

Preparation of sealing material for liquid crystal display panel 100 parts of a 70% esterified epoxy acrylate resin as a component (a) was blended with 3 parts of benzyl dimethyl ketal as a photopolymerization initiator of a component (b), 4 parts of 2-phenyl-4,5-dihydroxymethylimidazole and 4 parts of dihydrazide adipate as thermosetting agents of components (c), 50 parts of talc and 10 parts of fine silica particles as inorganic fillers, and 1 part of γ-glycidoxypropyltrimethoxysilane as a coupling agent by means of a triple roll mill. The above-mentioned epoxy acrylate resin as the component (a) was a resin in which 70% of an equivalent of an epoxy group of a bisphenol A type epoxy resin Epicoat 828 (trade name, made by Yuka Shell Epoxy Co., Ltd.) was esterified with acrylic acid. Furthermore, 5 parts of a cell spacer was mixed with 100 parts of the sealing material composition to prepare a sealing material 8 for a liquid crystal display panel.

Manufacture of liquid crystal display panel

As shown in FIG. 1, pixel electrodes 2 and polycrystalline silicon TFT as liquid crystal control elements 1 were formed on a quartz plate, and an organic polymer film 6 was applied thereonto. Afterward, the surface of the film 6 was subjected to a rubbing treatment to form an active matrix substrate 3. On the other hand, three primary color filters 5 were formed on a glass plate, and the organic polymer film 6 was then applied thereonto. Afterward, the surface of the film 6 was subjected to the rubbing treatment to form an opposite substrate 4.

Next, the sealing material 8 previously prepared in this example was screen-printed on the peripheral edge of the active matrix substrate 3 except an inlet portion of the peripheral edge through which the liquid crystal composition would be injected. Afterward, the substrate 3 was superposed upon the opposite substrate 4, while alignment was carried out so that the color filters 5 might correspond to the pixels of the liquid crystal control elements 1 (TFT).

The superposed substrates were irradiated with ultraviolet rays by the use of a high-voltage mercury vapor lamp (2 kW) for 30 seconds, and then heated at 150° C. for 30 minutes to set the sealing material 8, thereby manufacturing a liquid crystal cell.

Next, a fluorine-based liquid crystal composition 9 was injected into the liquid crystal cell through the inlet of the liquid crystal cell, and the inlet was then sealed with the sealing material 8. Afterward, this sealing material 8 of the inlet was similarly set to obtain a liquid crystal display panel.

For the thus obtained liquid crystal display panel, the permeability of moisture, the orientation of the liquid crystal, the electrical resistance of the liquid crystal and the adhesive strength of the substrates were evaluated. The results are shown in Table 1.

Comparative Example 1

The same procedure as in Example 1 was carried out except that a sealing material manufactured in Example 1 was replaced with an epoxy acrylate (overall ester) ultraviolet-setting type sealing material, to manufacture a liquid crystal display panel. Afterward, the permeability of moisture, the orientation of the liquid crystal, the electrical resistance of the liquid crystal and the adhesive strength of the substrates were evaluated. The results are shown in Table 1.

Comparative Example 2

The same procedure as in Example 1 was carried out except that a sealing material manufactured in Example 1 was replaced with a polyurethane acrylate ultraviolet-setting type sealing material, to manufacture a liquid crystal display panel. Afterward, the permeability of moisture, the orientation of the liquid crystal, the electrical resistance of the liquid crystal and the adhesive strength of the substrates were evaluated. The results are shown in Table 1.

Comparative Example 3

The same procedure as in Example 1 was carried out except that a sealing material manufactured in Example 1 was replaced with a polybutadiene acrylate ultraviolet-setting type sealing material, to manufacture a liquid crystal display panel. Afterward, the permeability of moisture, the orientation of the liquid crystal, the electrical resistance of the liquid crystal and the adhesive strength of the substrates were evaluated. The results are shown in Table 1.

TABLE 1

|  | Permeability of Moisture | Orientation of Liquid Crystal | Electrical Resistance of Liquid Crystal | Adhesive Strength |
| --- | --- | --- | --- | --- |
| Example 1 | Low | Good | High | Strong |
| Comp. Ex. 1 | Low | Good | High | Weak |
| Comp. Ex. 2 | High | Bad | Low | Strong |
| Comp. Ex. 3 | High | Bad | Low | Strong |

As being apparent from Table 1, in the liquid crystal display panels using the polyurethane acrylate ultraviolet-setting type sealing material and the polybutadiene acrylate ultraviolet-setting type sealing material, while the adhesive strength was fairly sufficient, the setting properties of the sealing material were insufficient. In consequence, the remaining unreacted material was dissolved in the liquid crystal. In addition, the permeability of moisture was high, and so the liquid crystal deteriorated, and the poor orientation of the liquid crystal and the decline of the electrical resistance were observed.

In the liquid crystal display panel using an epoxy acrylate (overall ester) ultraviolet-setting type sealing material, the setting properties of the sealing material were excellent, and so the unreacted material did not remain. In addition, the permeability of moisture was low, and the poor orientation of the liquid crystal and the decline of the electrical resistance were not observed, nevertheless the adhesive strength was insufficient.

On the contrary, the liquid crystal display panel manufactured in Example 1 made use of the sealing material containing the specific and partially esterified epoxy (meth)acrylate resin and having excellent setting properties. Therefore, the unreacted material did not remain, the permeability of moisture was low, the orientation of the liquid crystal was good, the decline of the electrical resistance was not observed, and the adhesive strength and reliability could be sufficiently secured.

As is apparent from the above-mentioned examples, the effect of the present invention is very large in the liquid crystal display panel in which the upper and lower substrates are different in materials (e.g., a cell formed by combining a polycrystalline silicon TFT substrate comprising a quartz substrate and a color filter substrate comprising a glass substrate).

The liquid crystal display panel of the present invention has sufficient resistance in an electrification test at high temperature and high moisture, standing tests at high temperature and low temperature, and a heat cycle test. Thus, the liquid crystal display panel has sufficient resistance to the permeability of moisture from the outside, and does not crack even owing to thermal stress. In consequence, it holds sufficient reliability as the liquid crystal display panel. In addition, since the sealing material of the present invention is used, the sufficient adhesive strength is obtained and simultaneously the deterioration of the liquid crystal composition is prevented. Accordingly, the poor orientation of the liquid crystal and the decline of the electrical resistance do not occur, hence the liquid crystal display panel is excellent in display characteristics.

What is claimed is:

1. A sealing material for a liquid crystal display panel comprising the following components (a), (b) and (c):
    (a) a partially esterified epoxy(meth)acrylate resin in which 10–90% of an equivalent of the epoxy group of a bisphenol A type epoxy resin is (meth)acrylated,
    (b) a photopolymerization initiator, and
    (c) a thermosetting agent comprising one or more imidazole and one or more organic acid hydrazide.

2. The sealing material for a liquid crystal display panel according to claim 1 wherein the amount of said component (b) to be blended is in the range of 0.1 to 15 parts by weight with respect to 100 parts by weight of said component (a).

3. The sealing material for a liquid crystal display panel according to claim 1 wherein the amount of said component (c) to be blended is in the range of 0.1 to 20 parts by weight with respect to 100 parts by weight of said component (a).

4. The sealing material for a liquid crystal display panel according to claim 1 which contains at least one of a reactive diluent, an inorganic filler and a coupling agent, in addition to said components (a), (b) and (c).

5. The sealing material for a liquid crystal display panel according to claim 4 wherein the amount of said reactive diluent to be blended is 100 parts by weight or less with respect to 100 parts by weight of said component (a).

6. The sealing material for a liquid crystal display panel according to claim 4 wherein the amount of said inorganic filler to be blended is 100 parts by weight or less with respect to 100 parts by weight of said component (a).

7. The sealing material for a liquid crystal display panel according to claim 4 wherein the amount of said coupling agent to be blended is 10 parts by weight or less with respect to 100 parts by weight of said component (a).

8. The sealing material for a liquid crystal display panel according to claim 1 wherein a spacer is blended in an amount of 1 to 50 parts by weight with respect to 100 parts by weight of said sealing material.

* * * * *